US006188193B1

(12) United States Patent
Michelson

(10) Patent No.: US 6,188,193 B1
(45) Date of Patent: Feb. 13, 2001

(54) LIGHT VALVE SHUTTER CONTROL SYSTEM WITH ZERO-LIGHT POSITION CONTROL

(76) Inventor: Manfred G. Michelson, 4396 Park Vincente, Calabasas, CA (US) 91302

(*) Notice: Under 35 U.S.C. 154(b), the term of this patent shall be extended for 0 days.

(21) Appl. No.: 09/388,786

(22) Filed: Sep. 2, 1999

Related U.S. Application Data

(60) Provisional application No. 60/098,984, filed on Sep. 2, 1998.

(51) Int. Cl.[7] ............................. G03B 27/32; G03B 27/72
(52) U.S. Cl. ......................... 318/625; 318/626; 250/229; 355/35; 355/83
(58) Field of Search .................................. 318/625, 626; 250/229; 352/141; 355/18, 32, 35, 67, 71, 83, 121

(56) References Cited

U.S. PATENT DOCUMENTS

| | | | |
|---|---|---|---|
| 3,682,540 | * | 8/1972 | Oxberry et al. ........................ 355/18 |
| 4,005,934 | * | 2/1977 | Wohlrab ................................. 355/88 |
| 4,009,959 | * | 3/1977 | Watson et al. ......................... 355/71 |
| 4,017,178 | * | 4/1977 | Wohlrab ................................. 355/32 |
| 4,108,537 | * | 8/1978 | Watson et al. ....................... 350/385 |
| 4,488,807 | * | 12/1984 | Watson ................................... 355/83 |
| 4,594,539 | | 6/1986 | Michelson ........................... 318/640 |

* cited by examiner

Primary Examiner—Bentsu Ro
(74) Attorney, Agent, or Firm—Christie, Parker & Hale, LLP

(57) ABSTRACT

A light valve has a pair of rotating vanes for controlling the cross section of a light beam passing between the vanes. The vanes rotate on corresponding shafts, each controlled by its own integral motor. Separate feedback control systems produce electrical control signals to each motor for rotating each shaft independently of the other to control the desired phase angles of the vanes. Error signals fed to variable gain amplifiers control the positions of the vanes. Whenever new commands are input to the variable gain amplifiers, amplifier gain is temporarily switched to a high gain mode, and after the phase angle of the shaft has stabilized, the amplifier gain is switched back to a low gain mode. The vanes are aligned on a common plane, and the vanes both rotate in an angular direction of rotation toward or away from the axis to reduce or enlarge the light opening between the vanes. The relative lengths of the vanes are such that they produce a slight overlap along their confronting outer edges when rotating to a closed light-blocking position aligned on the common plane. A time delay produced between the vanes when moving the vanes to the closed position prevents jamming of the vanes while their edges move toward closed position.

10 Claims, 8 Drawing Sheets

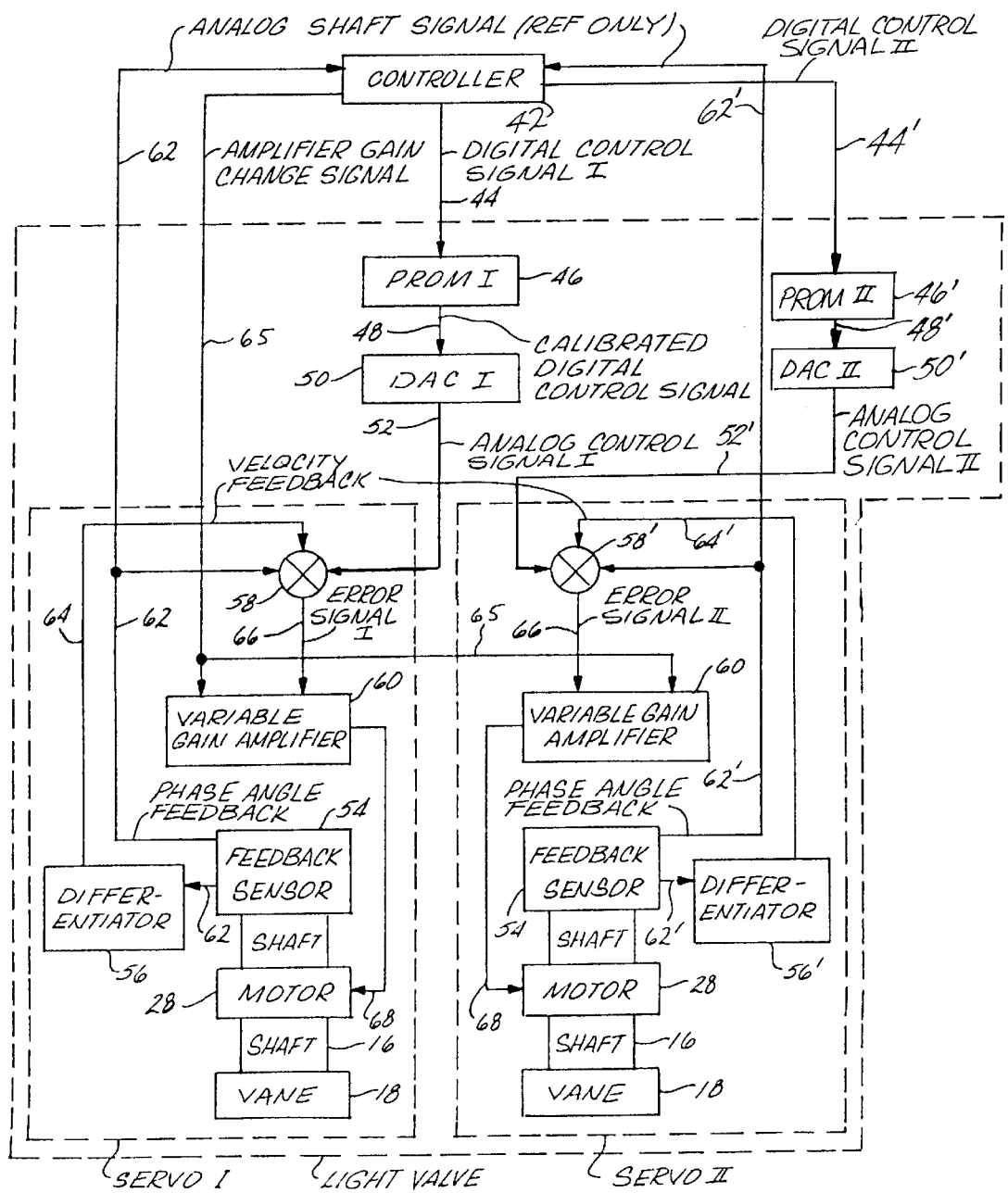

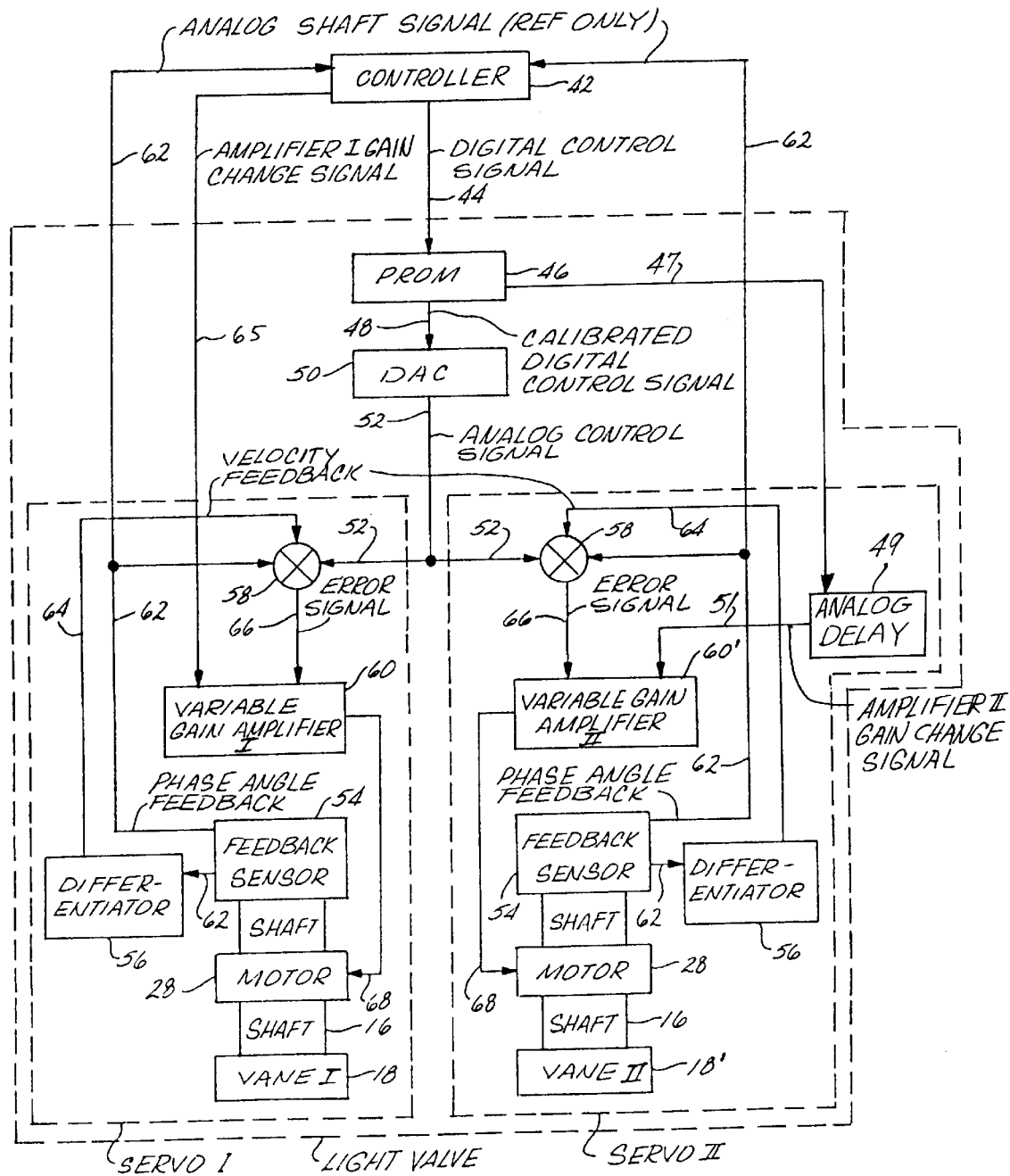

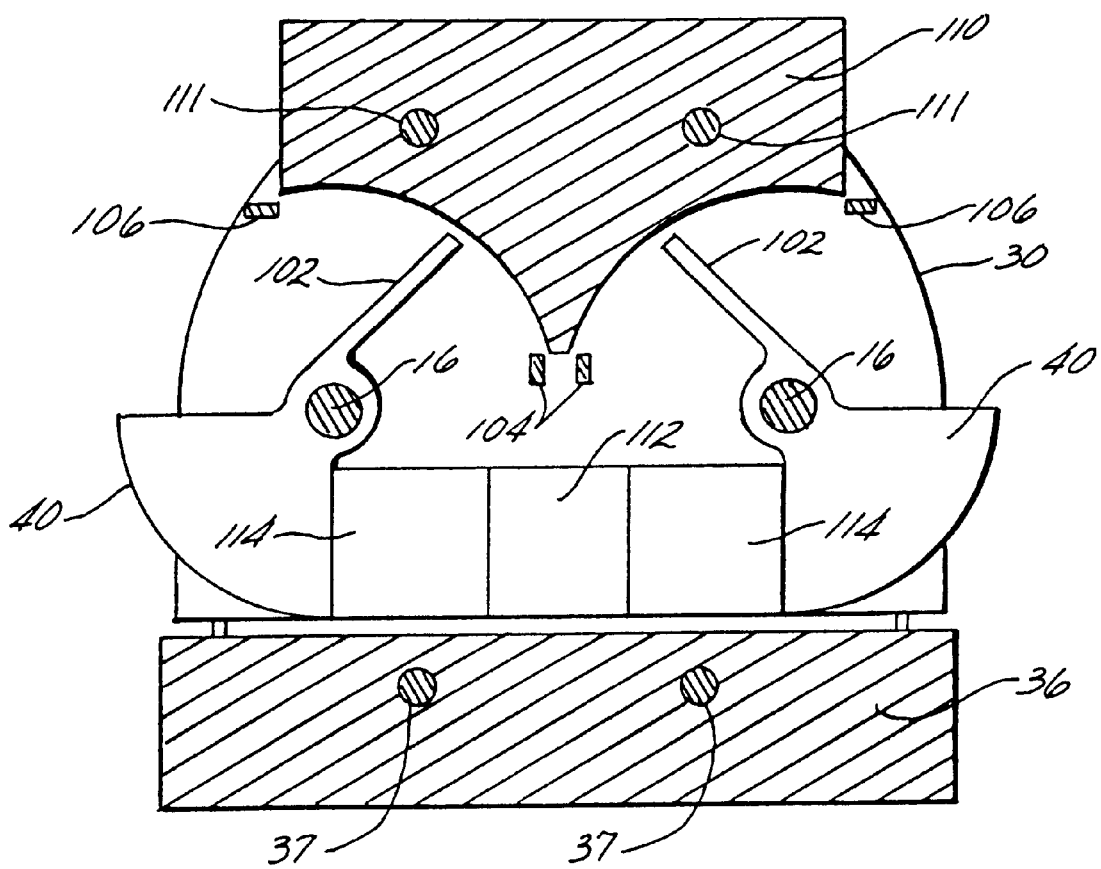

LIGHT VALVE SHUTTER CONTROL SYSTEM WITH ZERO-LIGHT POSITION CONTROL

CROSS REFERENCE

This application discloses improvements over the light valve disclosed in U.S. Pat. No. 4,594,539, and claims the priority of Provisional Patent Application No. 60/098,984, filed Sep. 2, 1998.

BACKGROUND OF THE INVENTION

1. Field of the Invention

This invention relates to light valves, and more particularly, to a light valve with rotatable vanes controlled by separate integral servo motors that provide a fast response time for the light valve. One use of the light valve is in high speed film printing. The invention is directed to a shutter control system having improved zero-light position control.

2. Description of the Prior Art

A light valve is a device that varies the size of an aperture through which a light beam passes. A common use of light valves today is in film printing. The light valve is adjusted to control the cross-sectional size of the light beam passing through it for adjusting the exposure in accordance with the light levels of scene changes in the film being printed. Typically, separate light valves are used for each of three principal colors in the film printing process (red, green and blue), and the exposures from each light valve are independently controlled.

A common form of light valve includes a pair of vanes carried on a pair of rotating shafts. The vanes protrude into the path of the light beam, and the shafts are rotated to move the vanes toward or away from each other to form a variable width optical slit for controlling the amount of light passing through the vanes. Usually, the shafts are counter-rotated relative to each other and through approximately the same phase angle so the center of the aperture formed by the vanes does not appreciably shift laterally during operation of the light valve.

Light valves of various forms have been developed in the past for controlling the phase angle of the shafts that rotate the vanes. These have included use of a stepper motor, or means for rotating the shafts against stops which have been preset prior to each new aperture change. When the shafts are rotated by a common motor, mechanical coupling means such as linkages, gears, or the like are used to rotate both shafts simultaneously through the same angle. Such mechanical coupling increases the inertia of the moving parts which, in turn, slows down the response time of the light valve. Also, it is difficult to avoid backlash and added elasticity which can cause oscillations in the mechanical system that controls the vanes.

Moreover, these problems are amplified when attempting to speed up the response time of the light valve. U.S. Pat. No. 4,594,539 discloses a light valve having a vane control system which can effectively operate at higher speeds than previously known light valves. For instance, in the past, the fastest light valves with mechanical coupling had a response time on the order of about 5 milliseconds. In a film printing system, "response time" is the time required for the vanes to assume a new position to produce a new sized aperture for each scene change in the film. Previous light valves with their connecting linkages and gearing experienced oscillation problems when operated at higher speeds. Film printing speed with such devices had been limited to about 600 feet per minute. The light valve disclosed in '539 patent fulfilled the need to provide a film printing system that could operate at higher speeds. The slow response time of the light valves with mechanical coupling as used in previous film printing systems had been a principal obstruction to higher speed printing.

In the '539 patent (see FIG. 8) the vanes 18 move in unison either toward or away from the light source. As the left vane rotates counter-clockwise toward the light source, the right vane rotates clockwise also toward the light. In normal operation there are instances in which the vanes may have to be totally closed instantaneously to completely block passage of light. In the FIG. 8 embodiment, the vanes do not close entirely. When moved to the closed position they leave a tiny narrow gap between their adjacent edges (through which one can see a narrow slit of light). The vanes must never touch each other because the power of each servo motor driving the vanes is approximately one horsepower; and the acceleration of the vanes is on the order of 1,000,000 radians/sec$^2$. If the vanes were long enough to touch each other (to block all light transmission) they could irrecoverably jam or damage the vanes or the servo motors.

There are certain applications that require a light valve that closes completely so that no light is transmitted. The present invention solves the problem of closing the vanes, while operating at high speeds, so that the vanes and servo motors are not damaged in the zero-light position.

SUMMARY OF THE INVENTION

Briefly, as described in the '539 patent, the light valve includes a pair of rotating vanes for controlling the cross-sectional size of a light beam passing between the vanes. The vanes rotate on corresponding shafts, each controlled by its own integral servo motor. Separate feedback control systems produce electrical control signals to operate each motor for rotating each shaft independently of the other to control the desired phase angle of the light-admitting vanes.

In one embodiment of the light valve described in the '539 patent, the shafts are supported on pre-loaded backlash-free bearings, and both motors are permanent magnet direct current servo motors in which the wound armature is an integral part of each shaft. In another embodiment, each servo has a variable gain amplifier controlled so as to switch from a low gain mode to a high gain mode with each new command signal. The controls switch back to the low gain mode after the light valve aperture stabilizes.

The light valve has a fast response time and greatly reduced tendency to oscillate at higher speeds because of absence of backlash; because of absence of elastic coupling between the two shafts and between the two shafts and the motor; and because of short, stiff elastic paths between the various masses located on each shaft.

Because of the lack of mechanical linkages or gearing between the two shafts, and because of using a separate motor for each shaft, response time of the light valve is greatly reduced, and accuracy is improved. Use of the separate variable gain amplifier in each servo system also produces faster response time, reduced tendency toward oscillations, and improved accuracy.

The present invention provides an improvement to the light valve disclosed in the '539 patent. According to the present invention, a light valve for varying the size of an opening through which a light beam passes comprises a pair of spaced apart rotatable shafts, and a corresponding vane mounted on each shaft so the vanes extend side by side into the space between the shafts. Light is directed toward the vanes so that rotation of the shafts causes the vanes to move through an angle toward or away from each other for varying the size of the light beam passing between the vanes. A separate servo motor coupled to each shaft rotates the shafts in unison to adjust the amount of light passing between the vanes. Each servo motor includes a closed loop servo system responsive to a vane position input signal representing a desired position of each vane for varying the size of the light beam passing between the vanes. A separate position feedback signal is generated as a function of the actual position of the vane on each rotatable shaft throughout operation of the light valve. Separate motor control signals, responsive to the vane position input signal and to each position feedback signal, are produced for independently controlling operation of each servo motor. Each shaft and vane is rotated to constantly pass a selected amount of light between the vanes in response to the motor control signals.

In one embodiment, (1) the vanes (when closed) are aligned on a common plane, (2) the vanes both rotate about parallel axes in the same rotational direction away from opposite sides of the plane to enlarge the light opening between the vanes, (3) the vanes both rotate in the same rotational direction toward the plane to reduce the light opening between the vanes, and (4) the width of the vanes is designed to produce a slight overlap along their confronting outer edges when rotating to the closed position on the common plane, to prevent jamming of the blades as they move to the closed position.

In another embodiment, (1) the vanes (when closed) are aligned on a common plane, (2) the vanes rotate in unison about parallel axes in opposite rotational directions on the same side of the plane to reduce or enlarge the amount of light transmission, (3) the width of the vanes is designed to produce a slight overlap along their confronting outer edges when the vanes are rotated to a closed light-blocking position aligned on the common plane, and (4) a time delay is produced between the vanes they move the vanes to the closed position to prevent jamming of the vanes when moving toward the closed position.

DRAWINGS

FIG. 1A is a block diagram illustrating one embodiment of a system for controlling the rotating shafts and vanes of a light valve according to principles of this invention.

FIG. 1B is a block diagram similar to FIG. 1A illustrating an alternative embodiment of the delay for light valve.

FIG. 6 is a cross section through the light valve, taken on line 6—6 of FIG. 2.

Figure 2:
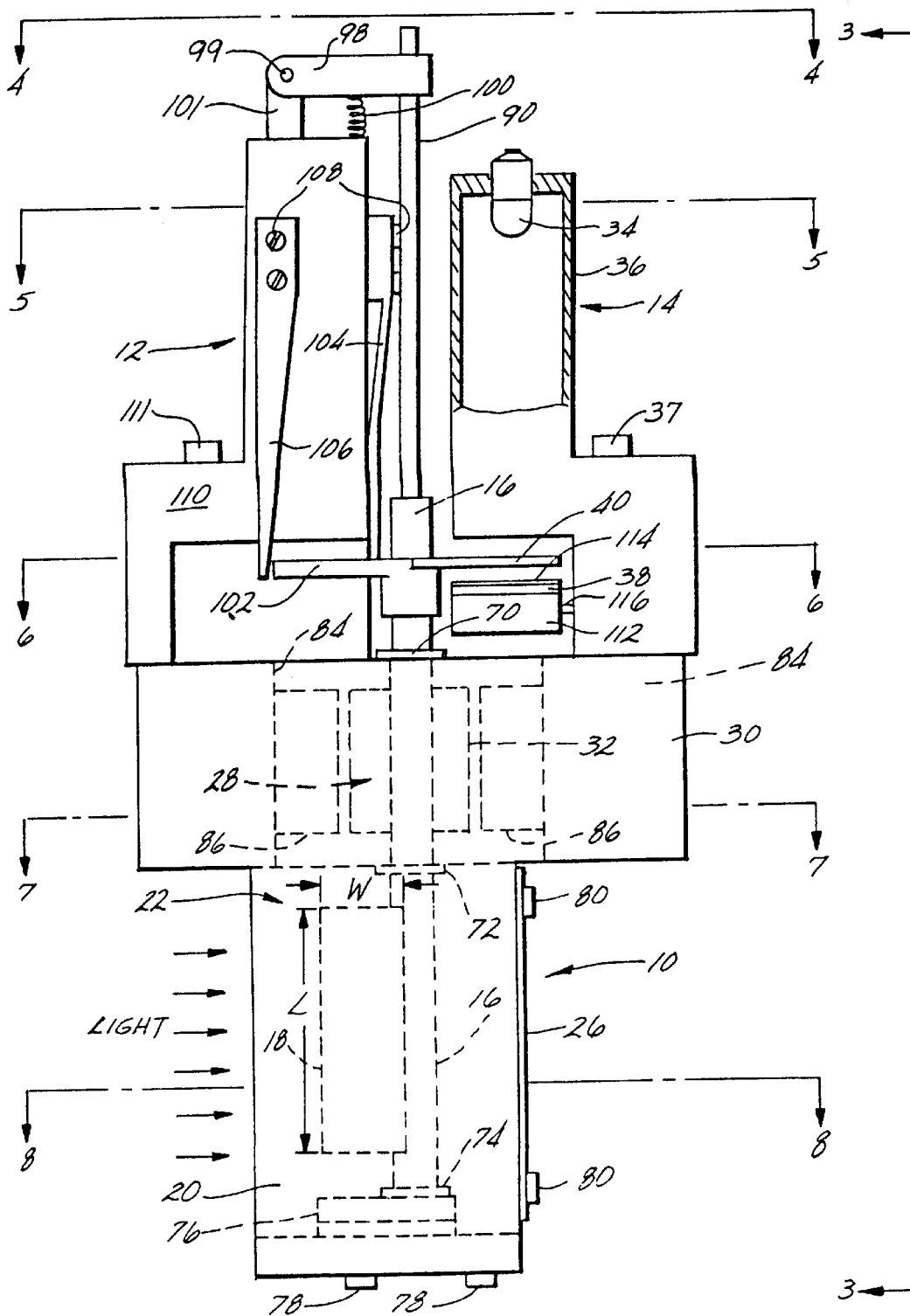
FIG. 2 is a semi-schematic side elevation view, partly broken away and partly in cross section, illustrating mechanical components of the light valve.
Figure 8:
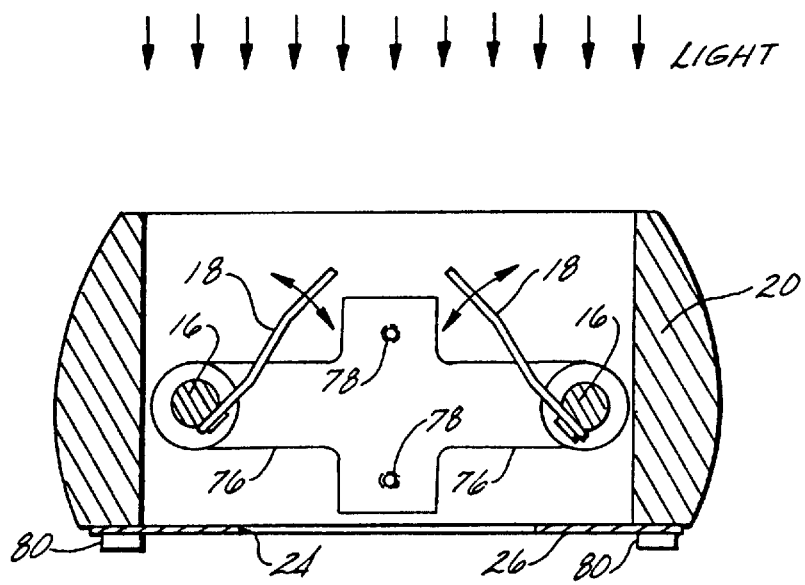
Figure 7:
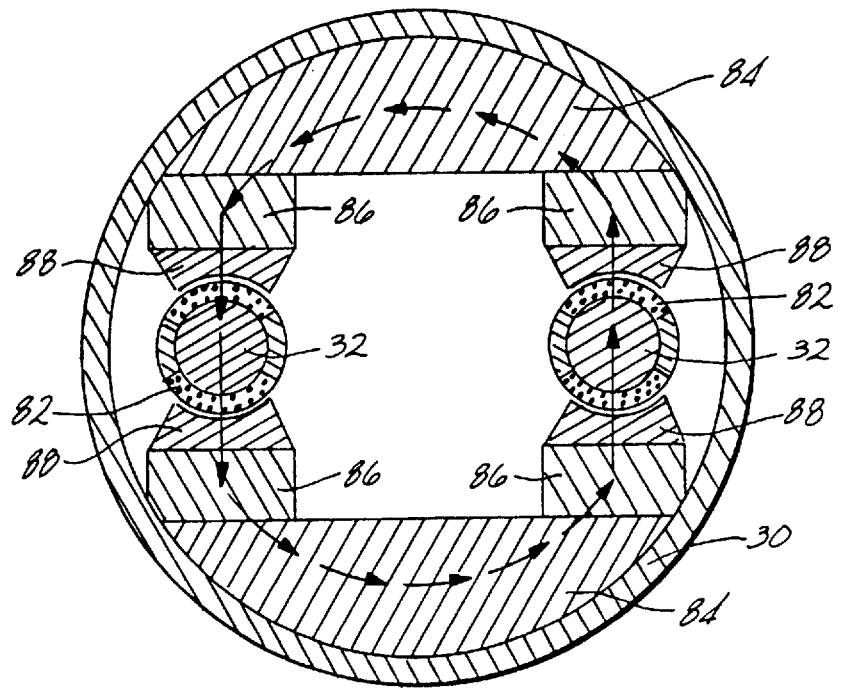
FIG. 7 is a cross section through the light valve, taken on line 7—7 of FIG. 2.

FIG. 8 is a cross section through the light valve, taken on line 8—8 of FIG. 2, illustrating a prior art shutter vane arrangement as disclosed in my U.S. Pat. No. 4,594,539.

Figure 9A:
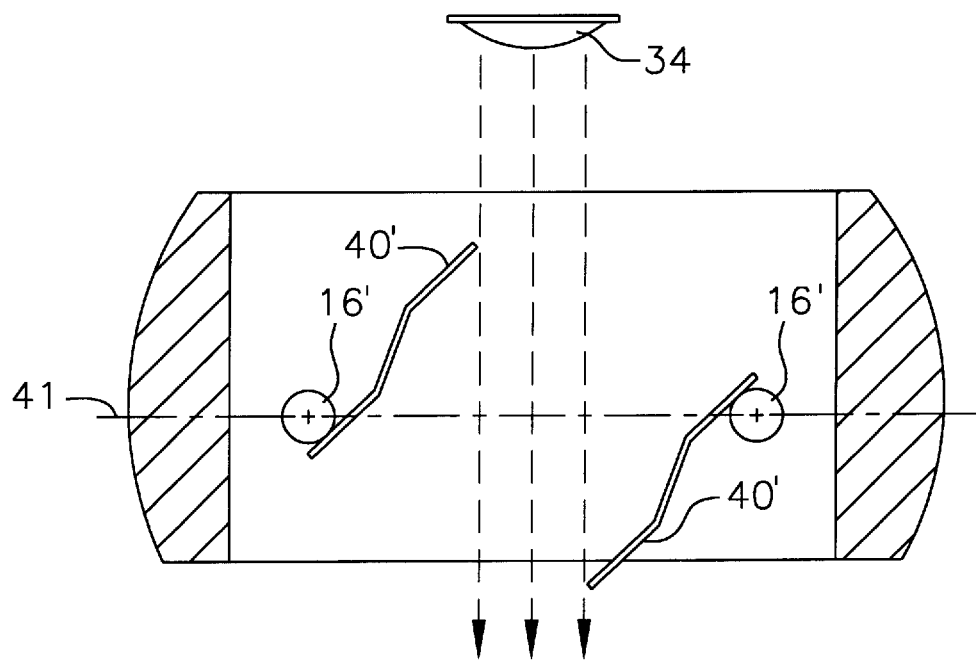

FIG. 9A is a semi-schematic elevational view illustrating one embodiment of the invention in which the shutter vanes of an improved zero light position controller are in an open position.

Figure 9B:
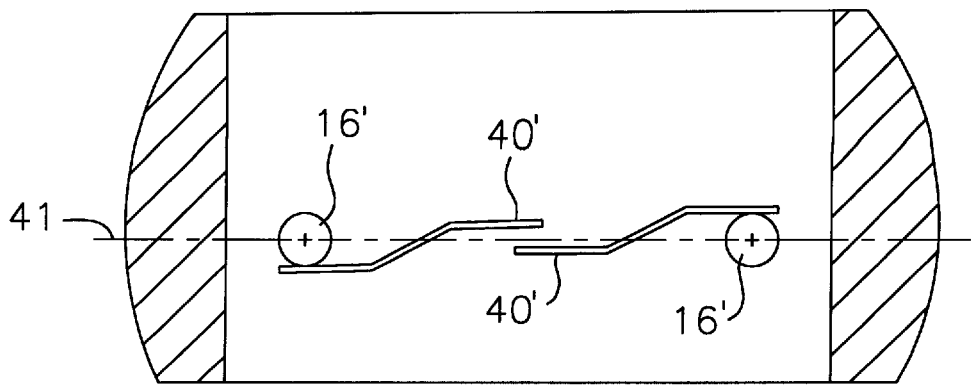

FIG. 9B is a semi-schematic elevational view similar to FIG. 9A illustrating the shutter vanes in which outer edges of the vanes overlap in the closed position

DETAILED DESCRIPTION

FIGS. 1A and 1B are block diagrams illustrating electrical controls for the light valve of this invention. The control systems of FIGS. 1A and 1B will be understood best by first referring briefly to FIGS. 2 and 3, which illustrate mechanical components of the light valve controlled by the control systems of FIGS. 1A or 1B. The light valve includes three principal assemblies, a vane assembly 10, a stop assembly 12, and an optical assembly 14. The vane assembly includes a pair of elongated shafts 16 mounted parallel to one another and rotatable independently about their longitudinal axes. Each shaft carries a thin, flat rectangular opaque vane 18. The vanes are rigidly affixed to the shafts by screws 19. The vanes are mounted adjacent to each other in a symmetrical arrangement so they project away from the shafts toward each other. The vanes are preferably rectangular and of the same size, defining a vane width W and a vane length L depicted in FIG. 2. The vanes are mounted inside an aperture section 20 of a vane housing 22. The vanes block part of the light passing through a rectangular aperture 24 in a plate 26 affixed to the aperture section of the housing. Light is directed through an opening in the side of the aperture section opposite the aperture plate. The light is directed toward the vanes. A controlled amount of light passing through the space between the vanes passes through the aperture 24 in the aperture plate 26. The shafts are controlled to rotate in unison for rotating the vanes toward or away from each other. This adjusts the amount of light passing through the aperture 24 to produce a controlled light exposure.

Figure 3:
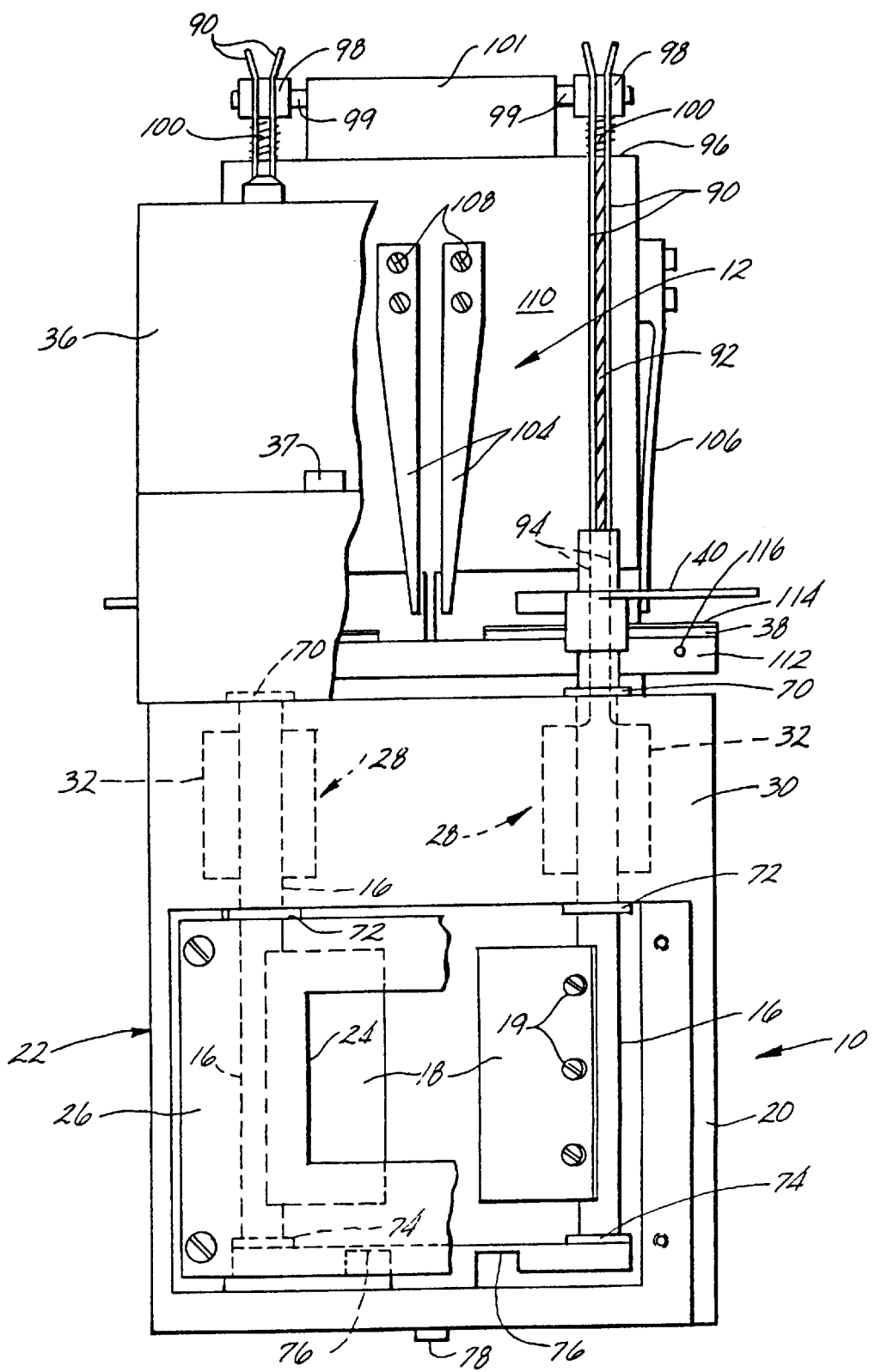
FIG. 3 is a semi-schematic side elevation view, partly broken away, taken on line 3—3 of FIG. 2.
Figure 4:
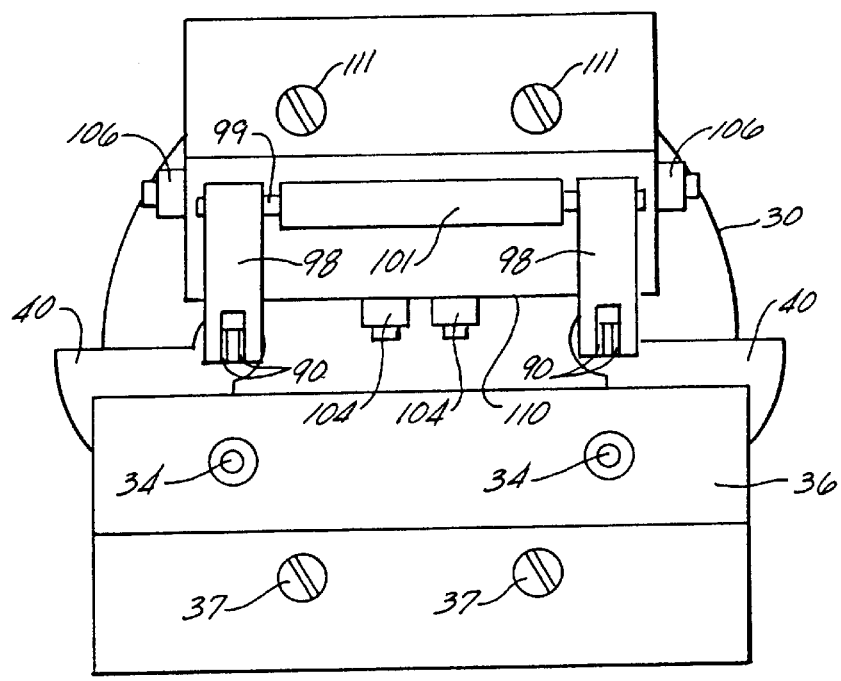
FIG. 4 is a top view of the light valve, taken on line 4—4 of FIG. 2.

Each shaft is rotatable by a separate servo motor 28 illustrated schematically in FIGS. 2 and 3. The servo motors are preferably permanent magnet direct current motors located in a servo motor section 30 of the housing 22. Each servo motor is mounted directly to the shaft in close proximity to the vane portion of the shaft. Other elements of the servo motors are described below.

The instantaneous phase angles of the vanes 18 are sensed by optical phase angle sensors, one for each shaft. Each phase angle sensor includes a light bulb 34 in the upper end of a bulb housing 36. The bulb housing is affixed to the vane housing by screws 37. Various means for generating light can be used in addition to the light bulb, such as a light emitting diode, for example. The light bulb illuminates a photocell 38, and an opaque shutter blade 40 carried on each shaft partially blocks the light flux passing to each photocell. The output voltage generated by each photocell is essentially proportional to the phase angle of each vane. These output voltage signals are used as vane phase angle feedback signals in the vane control system.

The control system will first be described with reference to FIG. 1A, which shows a controller 42 which produces a digital control signal 44 (also referred to as digital control signal I). The controller also produces a control signal 44' described below. The control signals 44 and 44' together represent the desired size of the aperture between the vanes at each instant throughout operation of the light valve. The controller can receive input signals from an external computer to represent desired time-dependent light changes.

In a film printing system, the controller can receive input data from a paper tape running with the film for indicating changing light levels from scene changes in the film. The digital control signal 44 from the controller is fed to a programmable read-only memory or PROM 46 (also referred to as PROM I) which produces a calibrated digital control signal 48. The PROM 46 is programmed to convert the digital signals from the controller into calibrated digital control signals that can be fed to a digital-to-analog converter or DAC 50 (also referred to as DAC I) to produce an analog control signal 52 (also referred to as analog control signal I). The analog voltage is a function of the instantaneous desired aperture opening through the vanes. This signal provides a reference position signal for each of two approximately identical second order servos, one for each shaft. Each of these two servos controls the phase angle of a separate shaft.

Because of variations in the properties of the feedback components from light valve to light valve, a somewhat different analog voltage signal 52 may be required to obtain for each light valve the same aperture size for the same digital input signal. In order to make different light valves interchangeable, the PROM in each light valve is programmed such that for the same digital input signal, the same aperture size is obtained for each light valve.

Each servo system includes the servo motor 28 for rotating the shaft 16 and vane 18; an optical phase angle sensor or feedback sensor 54 which includes the light bulb 34, the photocell 38 and the shutter blade 40; a differentiator 56; a summer 58; a variable gain amplifier 60; and a power supply (not shown in FIGS. 1A or 1B). One embodiment of the invention provides a light valve shutter control system having zero-light position control for the vanes 18. The objective is to prevent damage to the vanes or the servo motors when the vanes are closed. FIG. 1A illustrates one embodiment of a zero-light controller and FIG. 1B illustrates an alternative embodiment. These embodiments are described in more detail below with reference to FIGS. 9A and 9B.

In the FIG. 1A controller, each servo motor is controlled by a separate PROM and DAC. This embodiment includes a second digital control signal 44' (also referred to as digital control signal II) generated by the controller 42. Control signal 44' is fed to a second PROM 46' (also referred to as PROM II) which produces a second calibrated digital control signal 48'. A second DAC 50' (also referred to as DAC II) receives the signal 48' and generates a second analog control signal 52' (also referred to as analog control signal II).

The analog control signals 52 and 52' are fed to the summer 58 of one servo and 58' of the other servo. The voltage output from the photocell 38 in each optical phase angle sensor 54 provides a vane phase angle feedback signal 62 and 62'. The light falling on the photocell generates in it a voltage which is approximately proportional to the area of the photocell exposed to the light. A change in the phase angle of the shaft will change the amount of light blocked by the shutter blade 40. Therefore, the voltage generated by the photocell is an accurate measure of the actual phase angle of the shaft at each instant throughout operation of the light valve. This voltage is a function of the actual size of the aperture in the light valve (the aperture being the space between the vanes). The voltage output from the photocell is fed to the summer 58 as the vane position feedback signal 62 and to the summer 58' as the feedback signal 62'. The same vane angle feedback signal 62 is fed to the differentiator 56 which is also in the feedback loop. Vane angle feedback signal 62' is fed to the differentiator 56'. Each differentiator is an electronic differentiator which differentiates the phase angle feedback signal 62 or 62' and produces a voltage output 64 or 64' in the form of a velocity feedback signal proportional to the instantaneous angular velocity of the shaft. It is approximately independent of the phase angle of the shaft. The velocity feedback provides damping for the servo in a manner well known to the art of second order closed loop servo systems.

The output voltages 52 and 52' from the DAC 50 and 50', which represent the desired aperture size of the light valve, and the voltage output 62 and 62' from the photocell, which represents the actual aperture size of the light valve, and the time-differentiated voltage 64 and 64' from the photocell, which represents the angular velocity of the shaft, are fed to the summers 58 and 58', as shown in FIG. 1A. The sum of these three voltages represents an error signal 66 and a separate error voltage 66' each of which is amplified by a corresponding variable gain amplifier 60. Whenever new command signals are introduced into the light valve via the digital control signal 44, the variable gain amplifier is temporarily switched from a low gain mode to a high gain mode. Each variable gain amplifier receives an amplifier gain change signal 65 from the controller to indicate when the amplifier should be switched from one mode to the other. The high gain causes the shaft to assume its new phase angle in a very short time, but it also causes the residual phase angle error, due to bearing friction, to be small. After a short time delay, when the phase angle of the shaft has stabilized, the gain of the amplifiers switches back to its initial low gain mode. Switching back to the low gain mode does not change the residual phase angle error, but it reduces substantially any tendency to oscillations and also substantially reduces the residual error current. Reducing the residual error current becomes significant because it can prevent overheating of the motor armature if bearing friction should happen to become large at any time during operation of the light valve. The variable gain amplifier produces an amplified voltage output 68 which is fed to the servo motor 28. The magnitude of the voltage output 68 represents the instantaneous amount by which the motor must rotate the shaft to correct for the error signal so the error goes to zero.

The phase angle feedback signals 62 and 62' are also fed back to the controller 42 as an analog reference signal representing the instantaneous rotational position of the shaft. This provides safety monitoring for the light valve. For example, in a film printing system, if the actual size of the aperture is too large when compared with the desired aperture size, indicating that some problem may have developed in the controls, a command can be produced by the controller to stop the film from advancing.

FIG. 1A illustrates an alternative embodiment of a system for controlling the shutter vanes in the zero-light position. As mentioned previously, the shutter vane controls are described in more detail below with reference to FIGS. 9A and 9B. In the FIG. 1B embodiment the digital control signal 44, PROM 46 and DAC 50 produce an analog control signal 52 which is fed to the summer 58 for each servo motor controller. In this embodiment, the amplifier gain change signal 65 is fed to a first variable gain amplifier 60 (also referred to as variable gain amplifier I).

Whenever the controller sends a zero-light signal (defined as the totally closed position of the vanes), an output line 47 from the PROM activates an analog delay circuit 49 for producing a time delay control signal 51 sent to a second variable gain amplifier 60' (also referred to as variable gain amplifier II). The shutter vanes 18 and 18' (also referred to as vanes I and II) are operated with a relative time delay that avoids jamming of the vanes as they move toward the closed position.

The mechanical components of the light valve will now be understood best by referring to FIGS. 2 through 8. For clarity, the electronics have not been shown in these figures.

Each of the two shafts 16 is supported in the motor section 30 of the vane housing 22 by two backlash-free bearings 70 and 72. These bearings are mounted in close proximity to and on opposite sides of the motor 28. The bottom of each shaft is supported by a spherical bearing 74 which is preloaded by a corresponding leaf spring 76. Each leaf spring is attached to a base of the housing by screws 78. One of the other bearings 70 or 72 for each shaft also can be spring loaded. The aperture plate 26 is affixed to the vane section 20 of the housing by screws 80. As shown best in FIG. 8, the vanes project outwardly from their corresponding shafts at approximately the same angle. (FIG. 8 represents the shutter vane configuration of the light valve disclosed in U.S. Pat. No. 4,594,539. Improved shutter vane arrangements are described below with reference to FIGS. 9A and 9B.) The shafts are rotated about their longitudinal axes to rotate the vanes in the direction of the arrows shown in FIG. 8 for moving the vanes toward or away from each other to control the amount of light passing between them. The vanes block part of the light that passes through the aperture in the aperture plate of the light valve, and the magnitude of the blockage is a function of the phase angle of the shafts.

Each shaft is rotated by its own servo motor 28 which is integral with the shaft. In the illustrated embodiment, a motor armature 32 is integral with each shaft. Each armature 32 with its winding 82 (see FIG. 7) is situated in a strong magnetic field generated by permanent magnets 84 and fortified by pole shoes 86 and yokes 88. The stationary magnetic field, common for both motors, is generated by the permanent magnets plus the associated yokes and pole shoes. The magnetic field is indicated by the arrows in FIG. 7.

Electrical current required to rotate each shaft 16 is supplied to each armature winding by a separate pair of conductive strips 90. The conductive strips are elongated, thin, parallel, copper strips each extending upwardly from the upper end of each shaft. In one embodiment, the thin, conductive strips are 0.002 inch thick and 0.080 inch wide. Teflon tape (illustrated schematically at 92 in FIG. 3) between the conductive strips electrically insulates the two strips. The Teflon tape can extend the length of the strips as shown, but preferably is in small sections spaced apart along the length of the strips. The lower ends of the conductive strips are affixed as close a possible to the center of the shaft 16. In one embodiment, the upper end portion of the shaft is hollowed out, and the pair of conductive terminals 94 (see FIG. 3) from the armature winding extend through the hollowed-out portion of the shaft and connect to the lower ends of the conductive strips. A nylon bushing (not shown) surrounds the lower portions of the conductive strips to add stiffness. The interior of the nylon bushing is filled with epoxy or other nonconductive material.

The upper ends of each pair of conductive strips are held to a base 96 of the stop assembly 12 by a corresponding pivoted level 98. The levers pivot about a shaft 99 supported in a block 101 at the top of the base 96. A coil spring 100 pretensions the conductive strips, i.e., it applies a spring force in the same direction as the long axes of the strips. Thus, the upper ends of each pair of strips are stationary, while the lower ends of each pair rotate with the shaft. The conductive strips are affixed as close as possible to the center of rotation of the shafts in order to not be damaged by the large operational accelerations of the shafts.

The base of the stop assembly is mounted to the motor section 30 of the housing by screws 111. The stop assembly 12 includes a separate elongated arm 102 that rotates on each shaft on a side of the shaft opposite the shutter blade 40. The maximum angular travel of each shaft is limited by a pair of spring-loaded stops 104 and 106 positioned so they are contacted by the arm 102 at opposite ends of the shaft's angular travel. Each stop is a pre-loaded leaf spring mounted by screws 108 to a base 110 of the stop assembly. The stops accept the kinetic energy of the rotating masses in the event there is a malfunction of the servo system. The preload reduces the stopping travel of each shaft.

The power for each servo amplifier is provided by a large capacitor (not shown) located inside the light valve. The capacitor is charged by an external power source (not shown) which provides a maximum current that is much smaller than the maximum operating current of the motor. This is permissible because the charging time of the capacitor is much longer than the operating time of the motor. This provides the advantage of having small power wires to the light valve. Also, the low charging current creates only small electromagnetic interference. If a servo should malfunction and try to rotate a shaft against one of the stops, or if a servo tries to rotate a shaft against the drag of a damaged bearing, for example, the strong holding current discharges the capacitor in a rather short time period, after which only the small charging current provided by the external power source will run through the motor, preventing the motor from burning out.

Figure 5:
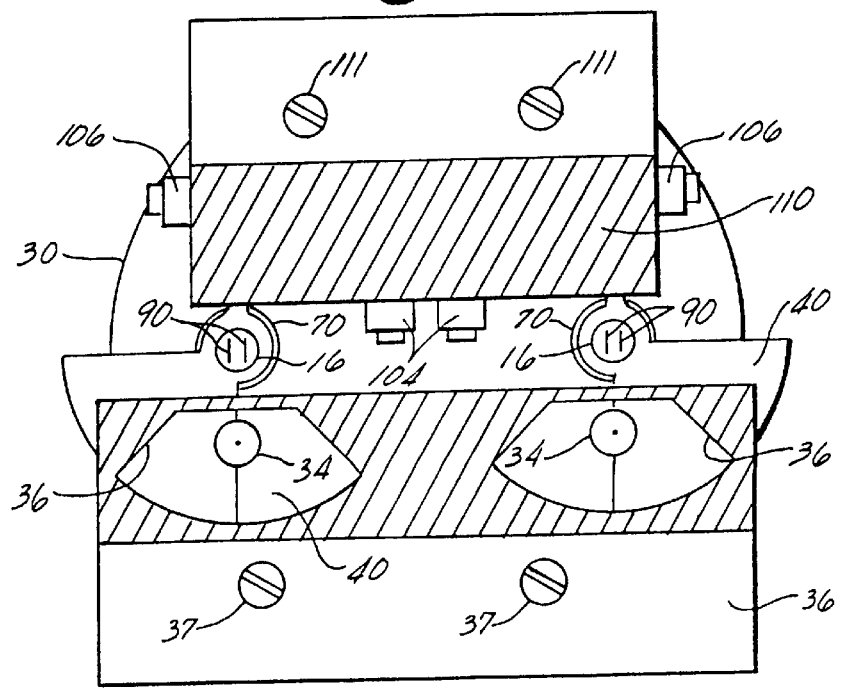
FIG. 5 is a cross section through the light valve, taken on line 5—5 of FIG. 2.

As described above, the optical phase angle sensor, one for each shaft, includes the light bulb 34 which illuminates the photocell 38, while the opaque blade 40 carried on the shaft partially blocks the light passing to the photocell. The light passing from the bulb to the photocell can pass through a mask which can best be described as being similar in shape to a quadrant of an annulus, concentric with the axis of rotation of the shaft. Alternatively, the cross section of the bulb housing 36 can be shaped approximately like a sector of an annulus, as shown in FIG. 5. The photocells are bonded to a substrate 112 and protected by a separate cover glass 114. The substrate is mounted to the bulb housing such that it has a small heat loss only through connecting means which can be pins 116 made of a low thermal conductivity material. The output voltage of the photocells is a function of photocell temperature. To prevent errors due to temperature changes of the photocell, each photocell is bonded to the substrate which is kept at a higher than ambient temperature by means of a heating resistor (not shown) and a control thermistor (not shown) both mounted to the substrate.

A second thermistor in the substrate permits monitoring of photocell temperature from the outside, if desired. In order to protect the photocell, the cover glass is bonded to its exposed, sensitive surface.

As described above, the light falling on the photocell generates a voltage which is approximately proportional to the area of the photocell exposed to the light. A change in the phase angle of the shaft will change the amount of light blockage caused by the shutter blade. Therefore, the voltage generated by the photocell is an accurate measure of the phase angle of the shaft, and therefore, the size of the aperture of the light valve. Because of the shape of the mask, as described, the generated voltage is approximately proportional to the phase angle.

Thus, a separate integral motor and closed loop servo system is provided for each shaft. The advantages are fast response time and a low tendency to oscillate even at high speeds.

The motor armature, vane, feedback blade, and stop are an integral part of each shaft. Thus, no linkages are required between the masses, and the elastic paths are short which enhances fast response and low tendency to oscillate.

The common stationary magnetic field serves both motors, which saves space.

Preloaded energy-absorbing stops are used to prevent damage to bearings and vanes in case of a malfunction of either servo. The preload reduces the stopping travel for a given amount of energy and given allowable maximum torque. The energy-absorbing stops are leaf springs preloaded in bending against their carrying structure. Thus, they require only a small amount of space in the area of greatest importance, viz., where the feedback blade and the photocell are located. The feedback blade and stop are a single monolithic part having the advantage of fewer parts mounted to the shaft.

The control system uses a digital input signal to control the aperture size of the light valve. The digital signal is reasonably immune to ambient noise and is insensitive to changes in the resistance of the input leads and contacts. The DAC can be a 12-bit unit which permits the light valve to be controlled in 4096 different steps. This permits versatile DAC control of the light valve by the programmer so as to match any other light valve.

The capacitor used as the power supply for the servo has small charging current, which permits use of inexpensive external power source, light power leads, and carries only small electromagnetic interference. Further, the limited energy storage capacity of the capacitor prevents the motor from being burned out in case of any malfunction of the servo or a shaft bearing.

The PROM in the light valve is programmed for each light valve individually such that any given digital input signal can generate the same aperture size in all light valves.

This provides interchangeability of light valves.

Since each shaft has an analog optical feedback, the photocell output does not vary with time except possibly for a small long-term drift. Furthermore, the output is continuous and has very little noise, which permits it to be differentiated electrically to obtain the angular shaft velocity. The electronic differentiator used to obtain angular shaft velocity is simple with no additional moving parts. The photocell for the optical feedback is mounted to a substrate maintained at a constant temperature by the heating resistor and thermistor. Thus, changes in ambient temperature do not influence the output of the photocell. The substrate of the photocell contains the additional thermistor which may be used to monitor the temperature of the photocell from outside the light valve. The sensitive surface of the photocell is protected by the cover glass which is bonded to it. This provides protection against ambient humidity which could otherwise influence the output of the photocell.

The interior shape of the light housing or the mask shape the beam of light falling on the photocell. Since the aperture of the mask has approximately the shape of a sector of an annulus concentric with the axis of rotation of the shaft, the output of the photocell is approximately proportional to the phase angle of the shaft. This provides an approximately constant gain for the servo amplifier independent of the phase angle. Since an additional lead is provided from the photocell to the outside of the light valve for monitoring, failure of the light valve can be easily detected.

The amplifier has a variable gain, viz., a high gain mode for positioning the shaft and a low gain mode for holding it. The high gain mode is switched on every time a new position signal arrives at the light valve. It causes the shaft to assume its new position in a very short time. The low gain, which is switched back on after the shaft position has stabilized, results in a low holding current, low heating and low oscillating tendency.

The light valve of this invention can be used in high speed film printing in which the light exposure for each principal color is controlled by a separate light valve. High speed film printing has been hampered in the past by light valves having a response time that is too slow, which either slows down film print speed, or if the film is run at higher speeds, then the wrong colors can be printed if the openings in the light valve are not accurate and able to change fast enough. In the present invention, an external signal from a computer or a paper tape moving with the film indicates every light change. Input signals from these external sources are fed to the light valve control systems for independently operating the separate servo motors. Response time is on the order of one millisecond for each change of aperture, which produces much faster film printing than in the past. With this invention, film printing speed can be as high as 3000 feet per minute.

FIGS. 9A and 9B illustrate the shutter vanes of a shutter vane controller for avoiding damage to the vanes in the zero-light position.

The vanes 40' are designed to overlap along their outer edges remote from their corresponding shafts 16'. I achieve this by manufacturing the light valve with vanes that are longer in width than the vanes of the '539 patent so that the ends of the vanes overlap a small amount when they move to the closed zero-light position. (The width of the vanes is defined by the dimension W in FIG. 2). The vanes are preferably symmetrical in size although one vane could be slightly longer than the other. The amount of overlap is preferably between 0.001 and 0.005 inch.

FIG. 9A represents one embodiment to prevent the vanes from jamming when moving to the closed position. Both vanes can be rotated in the same angular direction. For example, to open the vanes from a closed position, the left vane rotates counter-clockwise about its shaft 16' and the right vane also rotates counter-clockwise about its shaft 16'. When the vanes rotate to the closed position, their outer edges overlap as shown in FIG. 9B.

Another approach to achieve the same result is to manufacture the light valve such that the vanes 40' overlap when the vanes are rotated in different angular directions. In this instance the vanes 40' (when closed) are normally aligned on a common plane 41. The vanes rotate about parallel axes (through the shafts 16') in opposite rotational directions on the same side of the plane 41, to reduce or enlarge the amount of light transmission. The width of the vanes is designed to produce a slight overlap along their confronting outer edges when the vanes are rotated to a closed light-blocking position aligned on the plane 41. A time delay is produced between the vanes when moving the vanes toward the closed position, to prevent jamming of the vanes when moving them to the closed position. The time delay ensures that the outer edges of the vanes will overlap in the closed position, illustrated in FIG. 9B, which shows the left or top vane overlapping the right or bottom vane in the closed position. The time delay can be between 0.1 and 2.0 milliseconds.

FIG. 1A shows each of the servos being controlled by a separate PROM and DAC. The controller can be programmed to close one vane before the other.

Another way to implement a time delay is shown in FIG. 1B. The light valve PROM can be programmed so that whenever the controller sends out a zero-close signal, the output line 47 of the PROM will go high. This high signal can be used to actuate the analog delay circuit 49 which will inhibit the variable gain amplifier II from going into high gain mode for approximately 0.0005 sec. This will effectively delay the closing of vane II.

Another way of implementing the high gain delay (not shown) is to program the PROM such that one of the PROM output lines will directly control the variable gain amplifier II. In this case the delay is controlled by the controller 42.

A further way of implementing the high gain delay (not shown) is to have the controller 42 directly bring a signal via a separate electrical connection to the variable gain amplifier II.

Referring to another embodiment of the invention, existing light valves are typically installed in a dichroic filter lamphouse. Light changes are made between various scenes. In addition to making light changes the illumination of the entire light path is sometimes modulated with a device known as a fader, which is essentially a shutter that reduces or increases the amount of light flux exposing the film. A fader can thus produce fade outs, fade ins, or lap dissolves (a process where one scene slowly fades into another). One of the requirements of the fader is that ratio of the three primary colors (red, green, blue) or other combinations of different colors remain the same during the fade. It is necessary for this fader to ultimately close completely so that no light is transmitted to the film.

One application of the light valve of this invention is in an improved optical fader. The light valves can eliminate the fader vanes normally used in these systems. The fader system would include a conventional lamp directing light through conventional condenser optics toward a series of dichroic mirrors. The first set of mirrors are placed in series at 45° angles in the path of light from the condenser optics. The first dichroic mirror reflects blue light toward a first light valve, the second mirror reflects green light toward a second light valve, and the third mirror reflects red light toward a third light valve. Light passing through each light valve is directed to a corresponding one of a second series of dichroic mirrors (at 45° angles) through which reflected light from the three light valves emanates as white light.

In many instances 1000 watts of light are used, which is a tremendous amount of light passing through if a narrow gap is left when the vanes close. The film laboratories have solved this problem by installing an additional photographic type shutter, or dowser, together with the light valve, to be able to entirely shut down the light path. The present invention avoids use of additional light-blocking mechanisms such as photographic shutters or dowsers.

I claim:

1. A light valve for varying the size of an opening through which a light beam passes comprising:
    a pair of spaced apart rotatable shafts,
    a corresponding vane mounted on each shaft so the vanes extend side by side into the space between the shafts,
    in which light is directed toward the vanes so that rotation of the shafts causes the vanes to move through an angle toward or away from each other for varying the size of the light beam passing between the vanes,
    a separate servo motor coupled to each shaft for rotating the shafts in unison to adjust the amount of light passing between the vanes, and for each servo motor a closed loop servo system responsive to a vane position input signal representing a desired position of each vane for varying the size of the light beam passing between the vanes, in which a separate position feedback signal is generated as a function of the actual position of the vane on each rotatable shaft throughout operation of the light valve, and a controller responsive to the vane position input signal and to each position feedback signal for producing separate motor control signals for independently controlling operation of each servo motor to rotate each shaft and vane to constantly pass a selected amount of light between the vanes, in which: (1) the vanes are aligned on a common plane, (2) the vanes both rotate about parallel axes in the same rotational direction away from opposite sides of the plane to enlarge the light opening between the vanes, (3) the vanes both rotate in the same rotational direction toward the plane to reduce the light opening between the vanes, and (4) the relative lengths of the vanes are such that they produce a slight overlap along their confronting outer edges when rotating to the closed position on the common plane, to prevent jamming of the vanes as they move to the closed position.

2. An optical fader comprising light sources of different colors, and a separate light valve for controlling light passing from each source through the respective light valves, in which each light valve comprises the light valve of claim 1 for completely closing off light from each color source when fading to a zero light position.

3. A light valve for varying the size of an opening through which a light beam passes comprising:
    a pair of spaced apart rotatable shafts,
    a corresponding vane mounted on each shaft so the vanes extend side by side into the space between the shafts,
    in which light is directed toward the vanes so that rotation of the shafts causes the vanes to move through an angle toward or away from each other for varying the size of the light beam passing between the vanes,
    a separate servo motor coupled to each shaft for rotating the shafts in unison to adjust the amount of light passing between the vanes, and for each servo motor a closed loop servo system responsive to a vane position input signal representing a desired position of each vane for varying the size of the light beam passing between the vanes, in which a separate position feedback signal is generated as a function of the actual position of the vane on each rotatable shaft throughout operation of the light valve, and means responsive to the vane position input signal and to each position feedback signal for producing separate motor control signals for independently controlling operation of each servo motor to rotate each shaft and vane to constantly pass a selected amount of light between the vanes, in which: (1) the vanes are aligned on a common plane, (2) the vanes rotate in unison about parallel axes in opposite rotational directions on the same side of the plane to reduce or enlarge the amount of light transmission, (3) the width of the vanes is designed to produce a slight overlap along their confronting outer edges when the vanes are rotated to a closed light-blocking position aligned with the common plane, and (4) a time delay is produced between the vanes when moving the vanes to the closed position to prevent jamming of the vanes when moving toward the closed position.

4. An optical fader comprising light sources of different colors, and a separate light valve for controlling light passing from each source through the respective light valves, in which each light valve comprises the light valve of claim 3 for completely closing off light from each color source when fading to a zero light position.

5. Apparatus according to claim 3 in which each closed loop servo system varies the gain of a control signal fed to the motor, the control signal is switched between a high gain mode and a low gain mode in response to a change in an input command signal representing a desired change in the amount of light to be passed between the vanes.

6. Apparatus according to claim 5 in which the high gain mode for the control signal sent to one motor is delayed relative to the control signal sent to the other motor to generate said time delay.

7. A light valve for varying the size of an opening through which a light beam passes comprising:
   a pair of spaced apart rotatable shafts,
   a corresponding vane mounted on each shaft so the vanes extend side by side into the space between the shafts,
   means for directing light toward the vanes so that rotation of the shafts causes the vanes to move through an angle toward or away from each other for varying the size of the light beam passing between the vanes,
   a separate servo motor coupled to each shaft for rotating the shafts in unison to adjust the amount of light passing between the vanes, and for each servo motor, a closed loop servo system responsive to a vane position input signal representing a desired position of each vane for varying the size of the light beam passing between the vanes, and in which a separate position feedback signal is generated as a function of the actual position of the vane on each rotatable shaft throughout operation of the light valve, and a controller responsive to the vane position input signal and to each position feedback signal for producing separate motor control signals for independently controlling operation of each servo motor to rotate each shaft and vane to constantly pass a selected amount of light between the vanes; in which: (1) the vanes are aligned on a common plane, (2) the vanes both rotate about parallel axes in the same rotational direction away from opposite sides of the plane to enlarge the light opening between the vanes, (3) the vanes both rotate in the same rotational direction toward the plane to reduce the light opening between the vanes, and (4) the relative lengths of the vanes are such that they produce a slight overlap along their confronting outer edges when rotating to the closed position on the common plane, to prevent jamming of the vanes as they move to the closed position; or (1) the vanes are aligned on a common plane, (2) the vanes rotate in unison about parallel axes in opposite rotational directions on the same side of the plane to reduce or enlarge the amount of light transmission, (3) the width of the vanes is designed to produce a slight overlap along their confronting outer edges when the vanes are rotated to a closed light-blocking position aligned with the common plane, and (4) a time delay is produced between the vanes when moving the vanes to the closed position to prevent jamming of the vanes when moving toward the closed position.

8. A light valve for varying the size of an opening through which a light beam passes comprising:
   a pair of rotatable shafts,
   a corresponding vane on each shaft,
   in which light is directed toward the vanes so that rotation of the vanes can pass a selected amount of light between the vanes, a separate servo motor coupled to each shaft for rotating the shafts in unison to adjust the amount of light passing between the vanes,
   and for each servo motor a closed loop servo system for controlling operation of the motor to rotate its corresponding shaft to constantly pass a selected amount of the light between the vanes, in which each closed loop servo means generates: (1) a position feedback signal dependent upon the instantaneous phase angle of rotation of the vane, and (2) a velocity feedback signal dependent upon the rate at which the shaft is rotating; and in which the position feedback signal and the velocity feedback signal are summed along with an input command representing the desired amount of light to pass between the vanes to produce an error signal for controlling the motor; and in which:
   (1) the vanes are aligned on a common plane, (2) the vanes both rotate about parallel axes in the same rotational direction away from opposite sides of the plane to enlarge the light opening between the vanes, (3) the vanes both rotate in the same rotational direction toward the plane to reduce the light opening between the vanes, and (4) the relative lengths of the vanes are such that they produce a slight overlap along their confronting outer edges when rotating to the closed position on the common plane, to prevent jamming of the vanes as they move to the closed position; or
   (1) the vanes are aligned on a common plane, (2) the vanes rotate in unison about parallel axes in opposite rotational directions on the same side of the plane to reduce or enlarge the amount of light transmission, (3) the width of the vanes is designed to produce a slight overlap along their confronting outer edges when the vanes are rotated to a closed light-blocking position aligned with the common plane, and (4) a time delay is produced between the vanes when moving the vanes to the closed position to prevent jamming of the vanes when moving toward the closed position.

9. A light valve for varying the size of an opening a corresponding vane mounted on each shaft so that through which a light beam passes comprising:
   a pair of spaced apart rotatable shafts,
   a corresponding vane mounted on each shaft so the vanes extend side by side into the space between the shafts,
   in which light is directed toward the vanes so that rotation of the vanes causes the vanes to move through an angle toward or away from each other for varying the size of the light beam passing between the vanes,
   a separate servo motor coupled to each shaft for rotating the shafts in unison to adjust the amount of light passing between the vanes, and
   a closed loop servo system responsive to an input command representing a desired amount of light to pass between the vanes, the servo system responsive to the input command for producing separate motor control signals for independently controlling operation of each motor to constantly rotate the vanes in unison to pass a selected amount of light between the vanes; in which:
   (1) the vanes are aligned on a common plane, (2) the vanes both rotate toward or away from the axis to reduce or enlarge the light opening between the vanes, (3) the width of the vanes is such that the vanes produce a slight overlap along their confronting outer edges when rotated to a closed light-blocking position aligned with the plane.

10. Apparatus according to claim 9 in which a time delay is generated between the vanes to prevent jamming of the vanes when the vanes are rotated to the closed position.

* * * * *

UNITED STATES PATENT AND TRADEMARK OFFICE
CERTIFICATE OF CORRECTION

PATENT NO.    : 6,188,193 B1
DATED         : February 13, 2001
INVENTOR(S)   : Manfred G. Michelson It is certified that error appears in the above-identified patent and that said Letters Patent is hereby corrected as shown below:

<u>Title page,</u>
Item [57], ABSTRACT,
Line 21, after "edges move toward" insert -- a --.

<u>Column 14,</u>
Line 5, replace "(2)a" with -- (2) a --.
Lines 35-37, replace "opening a corresponding vane mounted on each shaft so that through which" with -- opening with a corresponding vane mounted on each shaft through which --.

Signed and Sealed this

Twenty-seventh Day of August, 2002

*Attest:*

*Attesting Officer*

JAMES E. ROGAN
*Director of the United States Patent and Trademark Office*